(12) United States Patent
Birau et al.

(10) Patent No.: US 8,586,141 B2
(45) Date of Patent: Nov. 19, 2013

(54) FLUORESCENT SOLID INK MADE WITH FLUORESCENT NANOPARTICLES

(75) Inventors: Maria M. Birau, Mississauga (CA); Gabriel Iftime, Mississauga (CA); Daryl W. Vanbesien, Burlington (CA); Jordan H. Wosnick, Toronto (CA); Christopher A. Wagner, Etobicoke (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/245,824

(22) Filed: Oct. 6, 2008

(65) Prior Publication Data
US 2010/0086683 A1 Apr. 8, 2010

(51) Int. Cl.
C09D 11/12 (2006.01)
C09D 11/02 (2006.01)
C09D 11/10 (2006.01)
B05D 5/06 (2006.01)
C09K 11/02 (2006.01)

(52) U.S. Cl.
USPC ............ 427/256; 252/301.35; 106/31.77

(58) Field of Classification Search
USPC .................................... 106/31.32
See application file for complete search history.

(56) References Cited

U.S. PATENT DOCUMENTS

| | | |
|---|---|---|
| 2,809,954 A | 10/1957 | Kazenas |
| 2,938,873 A | 5/1960 | Kazenas |
| 3,455,856 A | 7/1969 | Voedisch et al. |
| 3,590,000 A | 6/1971 | Palermiti et al. |
| 3,642,650 A | 2/1972 | McIntosh |
| 3,800,588 A | 4/1974 | Larson et al. |
| 3,847,604 A | 11/1974 | Hagenbach et al. |
| 3,944,493 A | 3/1976 | Jadwin et al. |
| 4,007,293 A | 2/1977 | Mincer et al. |
| 4,079,014 A | 3/1978 | Burness et al. |
| 4,291,111 A | 9/1981 | Lu |
| 4,338,390 A | 7/1982 | Lu |
| 4,394,430 A | 7/1983 | Jadwin et al. |
| 4,560,635 A | 12/1985 | Hoffend et al. |
| 4,714,682 A | 12/1987 | Schwartz |
| 4,830,671 A | 5/1989 | Frihart et al. |
| 4,889,560 A | 12/1989 | Jaeger et al. |
| 4,889,761 A | 12/1989 | Titterington et al. |
| 4,935,326 A | 6/1990 | Creatura et al. |
| 4,937,166 A | 6/1990 | Creatura et al. |
| 4,975,220 A | 12/1990 | Streitel et al. |
| 5,073,498 A | 12/1991 | Schwartz et al. |
| 5,093,147 A | 3/1992 | Andrus et al. |
| 5,094,777 A | 3/1992 | DiPietro |
| 5,194,638 A | 3/1993 | Frihart et al. |
| 5,221,335 A | 6/1993 | Williams et al. |
| 5,264,153 A | 11/1993 | De Krom |
| 5,278,020 A | 1/1994 | Grushkin et al. |
| 5,290,664 A | 3/1994 | Matsumoto |
| 5,294,664 A | 3/1994 | Morrison, Jr. et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,372,852 A | 12/1994 | Titterington et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,435,937 A | 7/1995 | Bell et al. |
| 5,439,971 A | 8/1995 | Hyche |
| 5,496,676 A | 3/1996 | Croucher et al. |
| 5,501,935 A | 3/1996 | Patel et al. |
| 5,527,658 A | 6/1996 | Hopper et al. |
| 5,529,876 A | 6/1996 | Sasaki et al. |
| 5,554,480 A | 9/1996 | Patel et al. |
| 5,585,215 A | 12/1996 | Ong et al. |
| 5,593,807 A | 1/1997 | Sacripante et al. |
| 5,597,856 A | 1/1997 | Yu et al. |
| 5,621,022 A | 4/1997 | Jaeger et al. |
| 5,650,255 A | 7/1997 | Ng et al. |
| 5,650,256 A | 7/1997 | Veregin et al. |
| 5,679,138 A | 10/1997 | Bishop et al. |
| 5,723,253 A | 3/1998 | Higashino et al. |
| 5,728,797 A | 3/1998 | O'Dell et al. |

(Continued)

FOREIGN PATENT DOCUMENTS

| | | |
|---|---|---|
| CN | 1278847 A | 1/2001 |
| CN | 1836012 A | 9/2006 |

(Continued)

OTHER PUBLICATIONS

Nov. 16, 2009 Search Report issued in 09171060.8.
U.S. Appl. No. 12/246,175, filed Oct. 6, 2008, Gabriel Iftime et al.
U.S. Appl. No. 12/245,820, filed Oct. 6, 2008, Gabriel Iftime et al.
U.S. Appl. No. 12/245,782, filed Oct. 6, 2008, Gabriel Iftime et al.
U.S. Appl. No. 12/246,120, filed Oct. 6, 2008, Maria Birau et al.
Sep. 16, 2011 Office Action issued in U.S. Appl. No. 12/246,120.
Nov. 10, 2011 Office Action issued in U.S. Appl. No. 12/245,820.
Oct. 14, 2011 Office Action issued in U.S. Appl. No. 12/245,782.
Sep. 29, 2011 Office Action issued in U.S. Appl. No. 12/246,175.
Feb. 25, 2013 Chinese Office Action issued in Chinese Patent Application No. 200910179019.6 (with translation).

(Continued)

*Primary Examiner* — Yun Qian
(74) *Attorney, Agent, or Firm* — Oliff & Berridge, PLC

(57) ABSTRACT

A nonpolar or solid (or phase change) ink composition that includes a carrier and at least one nanoscale fluorescent pigment particle composition and/or a fluorescent organic nanoparticle composition. The fluorescent organic nanoparticle composition includes a polymeric matrix obtained by modified EA latex process and/or emulsion polymerization and one or more fluorescent dyes and the nanoscale fluorescent pigment particle composition includes pigment molecules with at least one functional moiety, and a sterically bulky stabilizer compound including at least one functional group, the functional moiety of the pigment associates non-covalently with the functional group of the stabilizer.

12 Claims, No Drawings

(56) References Cited

U.S. PATENT DOCUMENTS

| | | | |
|---|---|---|---|
| 5,744,520 | A | 4/1998 | Kmiecik-Lawrynowicz et al. |
| 5,747,215 | A | 5/1998 | Ong et al. |
| 5,763,133 | A | 6/1998 | Ong et al. |
| 5,766,818 | A | 6/1998 | Smith et al. |
| 5,804,349 | A | 9/1998 | Ong et al. |
| 5,827,633 | A | 10/1998 | Ong et al. |
| 5,840,462 | A | 11/1998 | Foucher et al. |
| 5,853,943 | A | 12/1998 | Cheng et al. |
| 5,853,944 | A | 12/1998 | Foucher et al. |
| 5,869,215 | A | 2/1999 | Ong et al. |
| 5,869,216 | A | 2/1999 | Ong et al. |
| 5,869,558 | A | 2/1999 | Hou |
| 5,916,725 | A | 6/1999 | Patel et al. |
| 5,928,830 | A | 7/1999 | Cheng et al. |
| 5,945,245 | A | 8/1999 | Mychajlowskij et al. |
| 6,103,006 | A | 8/2000 | DiPietro |
| 6,120,967 | A | 9/2000 | Hopper et al. |
| 6,130,021 | A | 10/2000 | Patel et al. |
| 6,174,937 | B1 | 1/2001 | Banning et al. |
| 6,268,222 | B1 | 7/2001 | Chandler et al. |
| 6,294,306 | B1 | 9/2001 | Kmiecik-Lawrynowicz et al. |
| 6,309,787 | B1 | 10/2001 | Cheng |
| 6,399,713 | B1 | 6/2002 | MacQueen et al. |
| 6,413,692 | B1 | 7/2002 | Cheng |
| 6,447,974 | B1 | 9/2002 | Chen et al. |
| 6,458,501 | B1 | 10/2002 | Cheng et al. |
| 6,492,458 | B1 | 12/2002 | Pavlin |
| 6,537,364 | B2 | 3/2003 | Dietz et al. |
| 6,547,380 | B2 | 4/2003 | Smith et al. |
| 6,837,918 | B2 | 1/2005 | Pozarnsky et al. |
| 6,860,930 | B2 | 3/2005 | Wu et al. |
| 6,867,251 | B2 | 3/2005 | Wang et al. |
| 6,870,011 | B2 | 3/2005 | MacQueen et al. |
| 6,902,613 | B2 | 6/2005 | Bäbler |
| 6,906,118 | B2 | 6/2005 | Goodbrand et al. |
| 7,037,633 | B2 | 5/2006 | Hopper et al. |
| 7,160,380 | B2 | 1/2007 | Maeta et al. |
| 7,270,408 | B2 | 9/2007 | Odell et al. |
| 7,293,868 | B2 | 11/2007 | Odell et al. |
| 7,427,323 | B1 | 9/2008 | Birau et al. |
| 7,649,026 | B2 | 1/2010 | Allen et al. |
| 7,834,072 | B2 | 11/2010 | Carlini et al. |
| 7,897,653 | B2 | 3/2011 | Iftime et al. |
| 2002/0131941 | A1 | 9/2002 | Habeck et al. |
| 2003/0055178 | A1 | 3/2003 | Gore et al. |
| 2003/0199608 | A1 | 10/2003 | Kamigaki et al. |
| 2004/0063848 | A1 | 4/2004 | Olson et al. |
| 2004/0261657 | A1 * | 12/2004 | Wu et al. ............... 106/31.29 |
| 2005/0075453 | A1 | 4/2005 | Mathauer et al. |
| 2005/0186443 | A1 | 8/2005 | Marrocco, III et al. |
| 2006/0063873 | A1 | 3/2006 | Lin et al. |
| 2006/0144290 | A1 | 7/2006 | Polk et al. |
| 2006/0158491 | A1 | 7/2006 | Belelie et al. |
| 2006/0158492 | A1 | 7/2006 | Odell et al. |
| 2006/0159850 | A1 | 7/2006 | Breton et al. |
| 2006/0240353 | A1 | 10/2006 | Matsumura et al. |
| 2006/0293409 | A1 * | 12/2006 | Sanchez et al. ............... 523/160 |
| 2007/0012221 | A1 | 1/2007 | Maeta et al. |
| 2007/0020542 | A1 | 1/2007 | Patel |
| 2007/0082980 | A1 | 4/2007 | Lai et al. |
| 2007/0120921 | A1 | 5/2007 | Carlini et al. |
| 2007/0120924 | A1 | 5/2007 | Odell et al. |
| 2008/0087190 | A1 | 4/2008 | Iftime et al. |
| 2008/0090928 | A1 | 4/2008 | Iftime et al. |
| 2008/0182193 | A1 | 7/2008 | Agur et al. |
| 2008/0302272 | A1 * | 12/2008 | Allen et al. ............... 106/31.77 |
| 2008/0306189 | A1 | 12/2008 | Carlini et al. |
| 2008/0306193 | A1 | 12/2008 | Allen et al. |
| 2009/0155712 | A1 | 6/2009 | Sacripante et al. |
| 2009/0214972 | A1 | 8/2009 | Wosnick et al. |

FOREIGN PATENT DOCUMENTS

| | | | |
|---|---|---|---|
| CN | 1990613 A | 7/2007 | |
| EP | 0463260 A1 * | 2/1992 | ............ C09K 11/06 |
| EP | 1 736 514 A1 | 12/2006 | |
| GB | 1442835 | 7/1976 | |
| GB | 2 238 792 A | 6/1991 | |
| JP | 2002-285058 * | 10/2002 | ............ C09D 11/00 |
| JP | A-2005-238342 | 9/2005 | |
| JP | A-2007-23168 | 2/2007 | |
| JP | A-2007-23169 | 2/2007 | |
| JP | A-2007-23195 | 2/2007 | |
| WO | WO 94/11446 | 5/1994 | |
| WO | WO 2004/048482 | 6/2004 | |
| WO | WO 2006/005521 | 1/2006 | |
| WO | WO 2006/005536 | 1/2006 | |
| WO | WO 2006/011467 | 2/2006 | |
| WO | WO 2006/024103 | 3/2006 | |
| WO | WO 2006/132443 | 12/2006 | |
| WO | WO 2009/126388 A1 | 10/2009 | |

OTHER PUBLICATIONS

Apr. 11, 2013 Mexican Office Action issued in Mexican Patent Application No. MX/a/2009/010653 (with partial translation).
Feb. 25, 2013 Chinese Office Action issued in Chinese Patent Application No. 200910179014.3 (with translation).
Office Action for corresponding Canadian Patent Application No. 2,680,954, mailed on May 9, 2011.
Jun. 9, 2011 Office Action issued in U.S. Appl. No. 12/246,175.
Jun. 24, 2011 Office Action issued in U.S. Appl. No. 12/245,782.
Aug. 14, 2013 Office Action issued in Chinese Patent Application No. 200910179014.3 (with English-language Translation).

* cited by examiner

US 8,586,141 B2

FLUORESCENT SOLID INK MADE WITH FLUORESCENT NANOPARTICLES

TECHNICAL FIELD

The present disclosure generally relates to solid (or phase change) inks, particularly solid (or phase change) ink compositions containing at least one nanoscale fluorescent pigment particle and/or at least one fluorescent organic nanoparticle, and the use of such inks in methods for forming images, particularly their use in inkjet printing.

RELATED APPLICATIONS

Disclosed in commonly assigned U.S. patent application Ser. No. 11/759,906 filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

Disclosed in commonly assigned U.S. patent application Ser. No. 11/759,913 filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo faked pigment particles, comprising: preparing a first reaction mixture comprising (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Commonly assigned, U.S. patent application Ser. No. 11/187,007, filed Jul. 22, 2005, describes a toner comprising particles of a resin, a colorant, an optional wax, and a polygon coagulant, wherein said toner is prepared by an emulsion aggregation process.

Commonly assigned, U.S. patent application Ser. No. 10/606,298, filed Jun. 25, 2003, which has matured into U.S. Pat. No. 7,037,633, describes a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below the latex polymer glass transition temperature (Tg), and said second heating is above about the latex polymer Tg.

Commonly assigned, U.S. patent application Ser. No. 11/626,977, filed Jan. 25, 2007, describes a polyester resin emulsion comprising crosslinked polyester resin in an emulsion medium, the crosslinked polyester resin having a degree of crosslinking of from about 0.1% to about 100%.

Commonly assigned, U.S. patent application Ser. No. 11/548,774, filed Oct. 12, 2006, describes an ink set comprised of at least one radiation curable fluorescent ink comprising at least one curable monomer or oligomer, optionally at least one photoinitiator, and at least one fluorescent material, wherein upon exposure to activating energy, the fluorescent material fluoresces to cause a visible change in the appearance of the ink.

Commonly assigned, U.S. patent application Ser. No. 11/548,775, filed Oct. 12, 2006, describes an ink set comprised of at least one fluorescent phase change ink comprising at least one fluorescent material, wherein upon exposure to activating energy, the fluorescent material fluoresces to cause a visible change in the appearance of the ink.

The appropriate components, for example, waxes, coagulants, resin latexes, surfactants, and colorants, and processes of the above copending, applications and patents may be selected for the present disclosure in embodiments thereof. The entire disclosures of the above-mentioned applications are totally incorporated herein by reference.

REFERENCES

Suitable polymer matrices for commercially available fluorescent particles include polymers made from polycondensation of p-toluene-sulfonamide with melamine formaldehyde resins as described in U.S. Pat. Nos. 2,938,873; 2,809,954; and 5,728,797.

Polyamides matrices are described resulting from condensation of a diamine with a diacid (U.S. Pat. No. 5,094,777) or from polycarboxylic acid with aminoalcohols (U.S. Pat. No. 4,975,220), polyesters (U.S. Pat. No. 5,264,153) or copolymers of ethylene carbon monoxide (U.S. Pat. No. 5,439,971) are described.

Hu et. al. describe nanocolorants (dye dissolved in crosslinked polymer nanoparticles) fabricated by a miniemulsion polymerization process of a monomer in presence of a crosslinking agent. (Z. Hu, et. al., Dyes and Pigments 76 (2008) 173-178).

A number of fluorescent particles of a size less than 200 nm are made by the so-called staining method in order to avoid surface functionalization to provide particles that are robust against thermal or chemical degradation. U.S. Pat. No. 4,714, 682 describes a method of calibrating a flow cytometer or fluorescent microscope based on a set of highly uniform microbeads (with diameter of less than 5 microns) associated with a fluorescent dye; EP 1736514 describes fluorescent nanoparticles having a diameter between about 30 nm and about 100 nm.

U.S. Pat. No. 5,073,498 describes a staining process in which swelling is performed on polymer microparticles made of polystyrene in the presence of a fluorescent dye; this process provides particles containing fluorescent dye essentially on the surface, not uniformly distributed within the particles.

U.S. Pat. No. 6,268,222 describes large microparticles (several microns) having, surface fluorescent nanoparticles made by a staining method. With respect to the nanoparticles component, dye present only on the surface does not provide stability against thermal, light or chemical agents.

Active Motif Chromeon (Germany) and Sigma-Aldrich (Fluka) produce water dispersible fluorescent nanoparticles (less than 100 nm) usable for biological assays.

U.S. Pat. Nos. 3,455,856 and 3,642,650 describe methods of producing liquid-based inks having fluorescent particles less than 1 µm. The particles are dispersible in water, but not in organic solvents. No particle functionalization process is described and the particles (alkyd resins copolymerized with melamine formaldehyde) are not dispersible in organic solvents.

U.S. Pat. No. 5,294,664 describes water dispersible particles "not greater than 1 micron" obtained by emulsion polymerization of polystyrene incorporating fluorescent dye. The particles are not robust and are not dispersible in organic solvents.

BACKGROUND

Fluorescent inks and toners are among the most widely used security printing features. A printed document is usually authenticated by detecting the light emitted by the fluorescent component when subjected to black light. The light emitting property cannot be reproduced in a second generation copy.

Fluorescent dyes used in fluorescent inks and toners can lose fluorescence in the print-head when the ink is heated to a temperature greater than 120° C. to melt during normal operation. To overcome this problem, the security printing industry uses hard, robust pigments containing the dye of interest. Pigments are preferred over fluorescent dyes because of their improved chemical and light fastness as well as improved thermal stability. Pigments are also preferred by the industry because there is limited or no migration or bleeding of the colorant as generally observed with dye compounds.

Most commercially available fluorescent pigments are made by grinding a bulk polymer matrix containing fluorescent materials. This process does not result in fluorescent particles of a size smaller than 1-2 microns, and typically the size of these particles is about 4-5 microns. According to this process, fluorescent dyes are incorporated into hard, crosslinked particles, thereby limiting the mobility of the fluorescent dye. Once the fluorescent dye is isolated from interaction with other materials present in the ink and, chemical degradation by the environment is diminished. These hard particles are dispersed in the marking material, typically liquid inks.

Inks based on fluorescent pigments are currently used in rotogravure, flexographic, silk-screening and off-set printing systems. However, given their large size, inks based on these pigments cannot be used with inkjet, solid ink or UV curable inks, because they physically clog the inkjet nozzles.

Thus, there is a need in the art for fluorescent compositions, including fluorescent compositions that can be used in/with inkjet inks, solid ink, UV curable inks and EA (Emulsion Aggregation) toners and that have suitable thermal degradation properties. There is a further need for fluorescent compositions of such small size that can be used in or with inkjet inks, solid inks, UV curable inks and EA toners and be such that they are compatible with organic based marking materials.

The present disclosure addresses these needs by providing solid inks, particularly phase change ink compositions containing at least one nanoscale fluorescent pigment particle and/or at least one fluorescent organic nanoparticle, and the use of such inks in methods for forming images, particularly their use in inkjet printing.

Ink jetting devices suitable for use with the solid (or phase chance) inks of the present disclosure are known in the art, and thus extensive description of such devices is not required herein. As described in U.S. Pat. No. 6,547,380, incorporated herein by reference in its entirety, inkjet printing systems generally are of two types: continuous stream and drop-on-demand.

In continuous stream inkjet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium.

In drop-on-demand systems, a droplet is expelled from an orifice directly to a position on a recording medium in accordance with digital data signals. A droplet is not formed or expelled unless it is to be placed on the recording medium.

There are at least three types of drop-on-demand inkjet systems. One type of drop-on-demand system is a piezoelectric device that has as its major components an ink-filled channel or passageway having a nozzle on one end and a piezoelectric transducer near the other end to produce pressure pulses. Another type of drop-on-demand system is known as acoustic ink printing. An acoustic beam exerts a radiation pressure against objects upon which it impinges. When an acoustic beam impinges on a free surface (that is, liquid/air interface) of a pool of liquid from beneath, the radiation pressure that it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal inkjet, or bubble jet, which produces high velocity droplets. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In general, phase change inks are in the solid phase at, for example, ambient or room temperature, such as about 20° C. to about 27° C., but exist in the liquid phase at the elevated operating temperature of an inkjet printing device. At the jet operating temperature, the ink is molten and droplets of liquid ink are ejected from the printing device. When the ink droplets contact the surface of the recording substrate, either directly or via an intermediate heated transfer belt or drum, they quickly solidify to form a predetermined pattern of solidified ink drops.

In a typical design of a piezoelectric inkjet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head; that is, there is a small translation of the printhead with respect to the substrate in between each rotation. This approach simplifies the printhead design, and the small movements ensure good droplet registration.

Hot melt inks typically used with inkjet printers have a wax based ink vehicle, for example, a crystalline wax. Such solid inkjet inks provide vivid color images. In typical systems, these crystalline wax inks partially cool on an intermediate transfer member and are then pressed into the image receiving medium such as paper, spreading the image droplet, providing a richer color and lower pile height. The low flow of the solid ink also prevents show through on the paper.

In these systems, the crystalline wax inks are jetted onto a transfer member, for example, an aluminum drum, at temperatures of approximately 100-140° C. The wax based inks are heated to temperatures sufficient to decrease their viscosity for efficient and proper jetting onto the transfer member. The transfer member is at approximately 60° C., so that the wax will cool sufficiently to solidify or crystallize. As the transfer member rolls over the recording medium, for example, paper, the image comprised of wax based ink is pressed into the paper.

However, the use of crystalline waxes places limitations on the printed image. Conventional crystalline waxes are apolar aliphatic molecules bound together by weak van der Waals forces. These waxes have little natural affinity for the more polar paper substrate and, due to the nature of their own intermolecular bonding, are vulnerable to mechanical damage.

U.S. Pat. No. 6,906,118, incorporated herein by reference in its entirety, discloses phase change ink compositions wherein at a first temperature, hydrogen bonds of sufficient strength exist between the ink vehicle molecules so that the ink vehicle forms hydrogen bonded dimers, oligomers, or polymers, and wherein at a second temperature higher than the first temperature, the hydrogen bonds between the ink vehicle molecules are sufficiently broken that fewer hydrogen-bonded dimers, oligomers, or polymers are present in the ink at the first temperature so that the viscosity of the ink at the second temperature is lower than the viscosity of the ink at the first temperature.

While known compositions and processes are suitable for their intended purposes, a need remains for improvements in inkjetable phase change inks, for example, for solid (or phase change) inks that exhibit fluorescence with suitable degradation properties.

Typically, dyes have been the colorants of choice for inkjet printing inks because they are readily soluble colorants and, more importantly, do not hinder the reliable jetting of the ink. Dyes have also offered superior and brilliant color quality with an expansive color gamut for inks, when compared with conventional pigments. However, because dyes are molecularly dissolved in the ink vehicle, they are often susceptible to unwanted interactions that lead to poor ink and print quality performance. Examples include photooxidation from light leading to poor lightfastness, dye diffusion from the ink into paper or other substrates leading to poor image quality and print showthrough, and the ability for the dye to leach into another solvent that makes contact with the image leading to poor water and/or solvent fastness.

Key issues precluding pigment particle use for inkjet inks are their large particle sizes and wide particle size distribution, the combination of which can pose critical problems with reliable jetting of the ink (i.e. inkjet nozzles are easily blocked). Pigments are obtained as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost.

The following documents provide further background information:

U.S. Pat. No. 6,902,613 discloses a mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

WO 2004/048482 discloses a mixture of an organic nanosize pigment comprising of from 50 to 99% by weight of the nanosize pigment and 1 to 50% by weight based of a low molecular weight polysulfonated hydrocarbon, in particular naphthalene mono- or disulfonic acid formaldehyde polymer, and its use as a particle growth and crystal phase director for the preparation of a direct pigmentary organic pigment or in pigment finishing.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

U.S. Pat. No. 7,160,380 describes a method of producing a fine particle of an organic pigment, containing the steps of:

flowing a solution of an organic pigment dissolved in an alkaline or acidic aqueous medium, through a channel which provides a laminar flow; and changing a pH of the solution in the course of the laminar flow.

Thus, there is a need, which is addressed by embodiments of the present disclosure, for smaller fluorescent particles that minimize or avoid the problems associated with conventional larger-sized pigment particles. There further remains a need for processes for making and using such improved nanoscale fluorescent particles as colorant materials. Such nanoscale fluorescent particles are useful in, for example, paints, coatings and inks (e.g., inkjet printing inks) and other compositions where pigments can be used such as plastics, optoelectronic imaging components, photographic components, and cosmetics among others.

SUMMARY

The present disclosure addresses these and other needs, by providing solid (or phase change) inks containing nanoscale fluorescent pigment particles, and methods for producing such solid (or phase change) inks containing nanoscale fluorescent particles.

In an embodiment, the disclosure provides a method of forming an image, comprising:
melting an ink composition comprising:
    a solid or phase change ink composition,
    a polymeric dispersant,
    an optional non-fluorescent colorant including pigment, dye, mixtures of dyes, mixtures of pigments, mixtures of dyes and pigments, and the like, and
    a fluorescent nanoparticle,
jetting the phase change ink onto an image receiving substrate, wherein the phase change ink forms a solid state.

In an embodiment, the disclosure provides an ink composition comprising:
    a solid or phase change ink composition
    a polymeric dispersant,
an optional non-fluorescent colorant including pigment, dye, mixtures of dyes, mixtures of pigments, mixtures of dyes and pigments, and the like, and
    a fluorescent nanoparticle composition, comprising fluorescent organic nanoparticles and/or nanoscale fluorescent pigment particles.

Also disclosed herein are ink compositions comprising a fluorescent nanoparticle composition including fluorescent organic nanoparticles and/or nanoscale fluorescent pigment particles of the present disclosure. In particular embodiments, the fluorescent nanoparticle compositions of the present disclosure are used in inkjet compositions.

EMBODIMENTS

Disclosed herein are solid (or phase change) inks containing a carrier material and at least one fluorescent organic nanoparticle and/or at least one nanoscale fluorescent pigment particle.

In embodiments, the solid (or phase change) ink may also contain at least one "fluorescent organic nanoparticle." As used herein, "fluorescent organic nanoparticle" describes a polymer matrix comprising one or more polymer resins, including one or more crosslinked resins, and one or more fluorescent dyes dispersed inside the resin matrix. The fluorescent organic nanoparticles are of a maximum size less than about 500 nm, such as less than about 200 nm, or less than about 100 nm as measured with a Nicomp Particle analyzer.

In some embodiments, the fluorescent organic nanoparticles are robust, hard particles and are dispersible in organic liquids.

As used herein "disperse," "dispersible," and "dispersion" refer to the ability of the individual nanoparticle(s) to be stable in another phase, such as a liquid, without completely dissociating into the representative individual molecules that assembled to form the individual nanoparticle(s) or to be stable without undergoing flocculation to an extent such that the nanoscale particles become unstable, agglomerate or aggregate and settle The term "substantially colorless" as used herein refers to the transparency of the nanoscale fluorescent pigment particles and/or fluorescent organic nanoparticles dispersed in a liquid. Specifically, the nanoparticles are substantially colorless when a substantial portion of the individual nanoparticles dispersed in a liquid are undetectable upon visual inspection with visible light as the light source.

The "average" fluorescent organic nanoparticle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size can be measured by methods that use light scattering technology to infer particle size, such as Dynamic Light Scattering with a Nicomp Particle analyzer.

Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2 \ldots, A_n\}$ is denoted as $\mu_g$, then the geometric standard deviation is calculated as:

$$\sigma_g = \exp\sqrt{\frac{\sum_{i=1}^{n}(\ln A_i - \ln\mu_g)^2}{n}}$$

The small size of the fluorescent organic nanoparticles permits the dye particles to be used with inkjet compositions while avoiding physical clogging of the inkjet nozzles.

The term "average particle diameter" as used herein refers to the average length of the nanoscale fluorescent pigment particle as derived from images of the particles generated by Transmission Electron Microscopy (TEM).

The term "average aspect ratio" as used herein refers to the average ratio of the length divided by the width (length:width) of the nanoscale fluorescent pigment particle as derived from images of the particles generated by TEM.

The term "nanoscale" as used herein refers to pigment particles having a maximum length of less than or equal to about $5\times10^2$ nm in addition to a maximum width of less than or equal to about $1\times10^2$ nm.

Commercial pigments, having typical median particle sizes of at least about 100 nm to about 1 µm, have varied particle size distributions and varied particle aspect ratios. The aspect ratio of a particle relates its length dimension to its width dimension. Generally, the aspect ratio of a particle increases with its length dimension and, frequently, produces acicular and/or irregular morphologies that can include ellipsoids, rods, platelets, needles, and the like. Typically, pigments such as, for example, benzothioxanthene pigments have large particle size distribution as well as large distribution of particle aspect ratios and, potentially, a large distribution of particle morphologies. This scenario is undesirable because, apart from clogging the nozzle of the marking apparatus, it can lead to non-dispersed, phase-segregated inks or dispersions and the like made from such pigments having a large distribution of particle size and/or aspect ratio.

The ink composition also includes a carrier material, or mixture of two or more carrier materials. In the case of a solid (or phase change) inkjet ink composition, the carrier can include one or more organic compounds. The carrier for such solid ink compositions is typically solid at room temperature (about 20° C. to about 25° C.), but becomes liquid at the printer operating temperature for ejecting onto the print surface. Suitable carrier materials for solid ink compositions can thus include, for example, amides, including diamides, triamides, tetra-amides, and the like. Suitable triamides include, for example, those disclosed in U.S. Patent Application Publication No. 2004-0261656, the entire disclosure of which is incorporated herein by reference. Suitable other amides, such as fatty amides including monoamides, tetra-amides, mixtures thereof, are disclosed in, for example, U.S. Pat. Nos. 4,889,560, 4,889,761, 5,194,638, 4,830,671, 6,174,937, 5,372,852, 5,597,856, and 6,174,937, and GB 2 238 792, the entire disclosures of each are incorporated herein by reference. In embodiments where an amide is used as a carrier material, a triamide is particularly useful because triamides are believed to have structures that are more three-dimensional as compared to other amides such as diamides and tetraamides.

Other suitable carrier materials that may be used in the solid ink compositions include, for example, isocyanate-derived resins and waxes, such as urethane isocyanate-derived materials, urea isocyanate-derived materials, urethane/urea isocyanate-derived materials, mixtures thereof, and the like.

In some embodiments, a wax may act as a phase change agent in the ink. In these embodiment, the wax promotes an increase in viscosity of the ink as it cools from the jetting temperature, for example from about 75° C. to about 150° C., to the substrate temperature, which may be, for example, from about 20° C. to about 65° C.

As used herein, the term wax includes, for example, natural, modified natural, synthetic waxes and compounded waxes.

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Suitable waxes may include paraffins, olefins such as polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

Suitable phase change waxes include hydroxyl-terminated polyethylene waxes such as mixtures of carbon chains with the structure $CH_3$—$(CH_2)_n$—$CH_2OH$, where there is a mixture of chain lengths, n, where the average chain length is in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite (Sand Springs, Okla.).

Other suitable phase change waxes include alcohol waxes, for example, hydrogenated castor oil, 1-octadecanol, 1,10-decanediol and 1,12-dodecanediol. Other examples of mono functional alcohols that may be employed as phase change waxes herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In some embodiments, the solid (or phase chance) ink includes a urethane wax, an alcohol wax, an olefin wax, or a combination thereof.

Other suitable phase change waxes include carboxylic acid waxes, for example, UNACID® 350, UNACID® 425, UNACID® 550, UNACID® 700, with $M_n$ approximately equal to 390, 475, 565 and 720 g/mol, respectively. All of these waxes are commercially available from Baker-Petrolite (Sand Springs, Okla.).

The ability of the wax to crystallize contributes to its overall hardness, which imparts strength to the ink. The degree of crystallization may be controlled by regulating the degree of branching (that is, irregularity) of the wax. A high degree of linearity of the polyethylene chain generally yields a highly crystalline and hard material.

In other embodiments, the wax is a urethane wax. These compounds are the reaction product of an isocyanate and an alcohol.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of hi-her isocyanate functionalities include copolymers of TDI/HDI, and the like, and MDI oligomers, as well as mixtures thereof.

Some specific examples of suitably functionalized alcohols include 1,4-butanediol vinyl ether, 1,4-cyclohexanedimethanol vinyl ether, ethylene glycol vinyl ether, di(ethylene glycol) vinyl ether, glycidol, 3-methyl-3-oxetanemethanol, glycerol diglycidyl ether, all of which are available from Sigma-Aldrich (Milwaukee, Wis.); 3,4-epoxycyclohexanemethanol, which may be prepared as described by Crivello and Liu (J. Polym. Sci. Part A: Polym. Chem. 2000, vol. 38, pp 389-401); and the like.

In embodiments, the wax is functionalized with one or more curable moieties, including, for example, vinyl ethers; epoxides, such as cycloaliphatic epoxides, aliphatic epoxides, and glycidyl epoxides; oxetanes; (meth)acrylates, that is, acrylates and methacrylates; and the like.

A linear wax typically forms large spherulitie (crystalline) structures when solidified from the melt. Control of the spherulite size during solidification plays a role in image quality and durability. Large spherulites generally lead to hazy and brittle prints (J. Coatings. Tech. 2003, no. 936, pp 65-72). Spherulite growth typically proceeds outward from a seed, and in the melt, a spherulite will stop growing when it physically impedes into its nearest neighbor spherulite.

In a first embodiment the fluorescent nanoparticle, further comprises a fluorescent nanoparticle composition having at least one functional moiety, and at least one sterically bulky stabilizer compound each having at least one functional group, wherein the functional moiety on the pigment associates non-covalently with the functional group of the stabilizer so as to afford nanoscale-sized particles. Specific examples of these "nanoscale fluorescent pigment particles" are illustrated with nanoscale benzothioxanthene pigment particles, and methods for producing such nanoscale benzothioxanthene pigment particles.

Benzothioxanthene pigment particles, when properly synthesized using exemplary conditions and stabilizers outlined here in the embodiments, will have a more regular distribution of nanoscale particle sizes and particle aspect ratio (length:width), the latter being about less than 5:1 to about 1:1 with the average particle length of less than about 500 nm, such as less than about 150 nm, or less than about 100 nm as measured in TEM images; and the average particle width of less than about 100 nm, such as less than about 30 nm, or less than about 20 nm, as measured in TEM images.

An advantage of the processes and compositions of the disclosure is that they provide the ability to tune particle size and composition for the intended end use application of the benzothioxanthene pigment. In embodiments, as both the particle size and particle size distribution of pigment particles decreases, the more transparent the particles become. Preferably, this leads to an overall higher color purity of the pigment particles when they are dispersed onto various media via from being coated, sprayed, jetted, extruded, etc.

A steric stabilizer may have the potential to associate itself with the pigment's and/or the pigment precursor's functional moieties via, for example, hydrogen bonding, van der Waals forces, and aromatic pi-stacking such that a controlled crystallization of nanopigment particles occurs. That is, the steric stabilizer provides a functional group that is a complementary part to the functional moiety of the pigment and/or the pigment precursor. The term "complementary" as used in the phrase "complementary functional moiety of the stabilizer" indicates that the complementary functional moiety is capable of non-covalent chemical bonding such as "hydrogen bonding" with the functional moiety of the organic pigment and/or the functional moiety of the pigment precursor. The steric stabilizer loading in the reaction may vary between 5 to about 300 mol %, such as about 10 to 150% mol or about 20 to 70% mol to pigment The functional moiety of the organic pigment/pigment precursor may be any suitable moiety capable of non-covalent bonding with the complementary functional moiety of the stabilizer. For the pigment, illustrative functional moieties include, but are not limited to, the following: carbonyl groups (C═O); various sulfur containing groups, for example, sulfides, sulfones, sulfoxides, and the like; and substituted amino groups. For the pigment precursor, functional moieties include, but are not limited to, carboxylic acid groups (COOH), ester groups (COOR, where R is any hydrocarbon), anhydride groups, and amide groups.

Representative precursors include substituted naphthalene anhydrides and anilines, as indicated in Scheme 1 below. The functional moieties $R_1$, $R_2$, $R_3$, $R_4$, $R_5$, $R_6$, $R_7$, $R_8$ may be present at any position on the naphthalene and aniline aromatic ring such as ortho, meta or para; they may be different or identical with each other and include, but are not limited to, any combination of the following functional groups: H, methyl, methoxy and carbonyl.

The pigment is prepared according to Scheme 1.

Scheme 1. Synthesis of benzo[k,1] thioxanthene-3,4-dicarboxylic anhydride

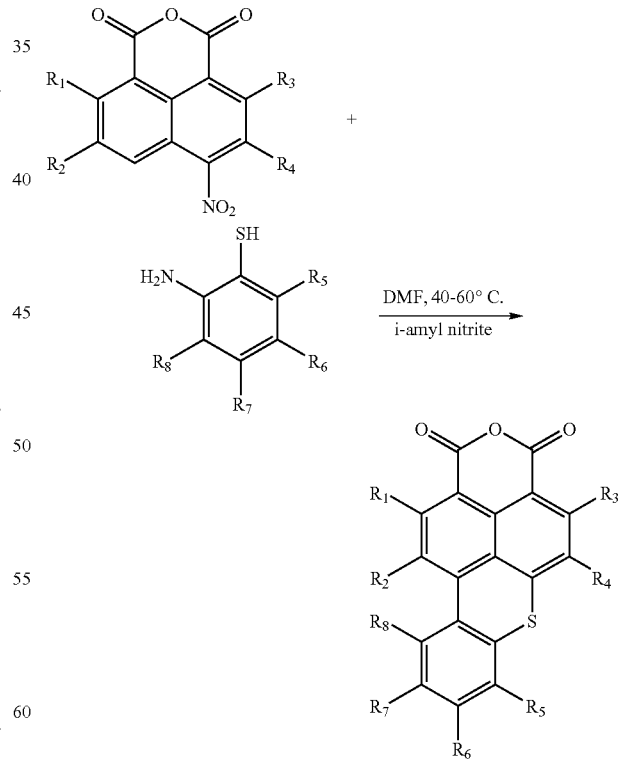

Illustrative examples of such functional moieties include: $R_1$=$R_2$=$R_3$=$R_4$=$R_5$=$R_6$=$R_7$=$R_8$=H, any alkyl, any aryl; $R_1$=$CH_3$, any alkyl, any aryl, O-alkyl, O-aryl, CH═O, $R_2$=$R_3$=$R_4$=$R_5$=$R_6$=$R_7$=$R_8$=H; $R_2$=$CH_3$, any alkyl, any aryl, O-alkyl, O-aryl, CH=O, $R_1=R_3=R_4=R_5=R_6=R_7=R_8$=H; $R_3$=CH$_3$, any alkyl, any aryl, O-alkyl, O-aryl, CH=O, $R_1=R_2=R_4=R_5=R_6=R_7=R_8$=H; $R_4$=CH$_3$, any alkyl, any aryl, O-alkyl, O-aryl, CH=O, $R_1=R_2=R_3=R_5=R_6=R_7=R_8$=H; $R_5$=CH$_3$, any alkyl, any aryl, O-alkyl, O-aryl, $R_1=R_2=R_3=R_4=R_6=R_7=R_8$H; $R_6$=CH$_3$, any alkyl, any aryl, O-alkyl, O-aryl, $R_1=R_2=R_3=R_4=R_5=R_7=R_8$=H; $R_7$=CH$_3$, any alkyl, any aryl, O-alkyl, O-aryl, $R_1=R_2=R_3=R_4=R_5=R_6=R_8$=H; $R_8$=CH$_3$, any alkyl, any aryl, O-alkyl, O-aryl, $R_1=R_2=R_3=R_4=R_5=R_6=R_7$=H; $R_1=R_2$=CH$_3$, any alkyl, any aryl, O-alkyl, O-aryl, CH=O, $R_3=R_4=R_5=R_6=R_7=R_8$=H; $R_1=R_4$=CH$_3$, any alkyl, any aryl, O-alkyl, O-aryl, CH=O, $R_3=R_2=R_5=R_6=R_7=R_8$=H; $R_1=R_3$=CH$_3$, any alkyl, any aryl, O-alkyl, O-aryl, CH=O, $R_4=R_2=R_5=R_6=R_7=R_8$=H; $R_2=R_3$=CH$_3$, any alkyl, any aryl, O-alkyl, O-aryl, CH=O, $R_1=R_4=R_5=R_6=R_7=R_8$=H; $R_3=R_4$=CH$_3$, any alkyl, any aryl, O-alkyl, O-aryl, CH=O, $R_1=R_2=R_5=R_6=R_7=R_8$=H; $R_1=R_2=R_3$=CH$_3$, any alkyl, any aryl, O-alkyl, O-aryl, CH=O, $R_4=R_5=R_6=R_7=R_8$=H; $R_1=R_3=R_4$=CH$_3$, any alkyl, any aryl, O-alkyl, O-aryl, CH=O, $R_2=R_5=R_6=R_7=R_8$=H; $R_1=R_2=R_3=R_4$=CH$_3$, any alkyl, any aryl, O-alkyl, O-aryl, CH=O, $R_5=R_6=R_7=R_8$=H; $R_1=R_2=R_3=R_4$=CH$_3$, any alkyl, any aryl, O-alkyl, O-aryl, CH=O, $R_5$=CH$_3$, any alkyl, any aryl, O-alkyl, O-aryl, $R_6=R_7=R_8$=H; $R_1=R_2=R_3=R_4$=CH$_3$, any alkyl, any aryl, O-alkyl, O-aryl, CH=O, $R_6$=CH$_3$, any alkyl, any aryl, O-alkyl, O-aryl, $R_5=R_7=R_8$=H; $R_1=R_2=R_3=R_4$=CH$_3$, any alkyl, any aryl, O-alkyl, O-aryl, CH=O; $R_7$=CH$_3$, any alkyl, any aryl, O-alkyl, O-aryl, $R_5=R_6=R_8$=H; and $R_1=R_2=R_3=R_4$=CH$_3$, any alkyl, any aryl, O-alkyl, O-aryl, CH=O, $R_8$=CH$_3$, any alkyl, any aryl, O-alkyl, O-aryl, $R_5=R_6=R_7$=H.

The complementary functional moiety of the stabilizer may be any suitable moiety capable of non-covalent bonding with the functional moiety of the stabilizer. Illustrative compounds containing complementary functional moieties include, but are not limited to, the following classes: beta-amino carboxylic acids and their esters containing large aromatic moieties such as phenyl, benzyl, naphthyl and the like, long linear or branched aliphatic chains such as having about 5 to about 20 carbons such as pentyl, hexyl, heptyl, octyl, nonyl, decyl, undecyl and the like; beta-hydroxy carboxylic acids and their esters containing long linear, cyclic or branched aliphatic chains such as having 5 to about 60 carbons such as pentyl, hexyl, cyclohexyl, heptyl, octyl, nonyl, decyl, undecyl and the like; sorbitol esters with long chain aliphatic carboxylic acids such as lauric acid, oleic acid, palmitic acid, stearic acid; polymeric compounds such as polyvinylpyrrolidone, poly(1-vinylpyrrolidone)-graft-(1-hexadecene), poly(1-vinylpyrrolidone)-graft-(1-triacontene), and poly(1-vinylpyrrolidone-co-acrylic acid).

The sterically bulky group of the stabilizer may be any suitable moiety that limits the extent of particle self-assembly to nanosized particles. It is understood that "sterically bulky group" is a relative term requiring comparison with the size of the precursor/pigment; a particular group may or may not be "sterically bulky" depending on the relative size between the particular group and the precursor/pigment. As used herein, the phrase "sterically bulky" refers to the spatial arrangement of a large group attached to a molecule.

Representative stabilizers to enable nanosized particles include but are not limited to, the following: mono and tri-esters of sorbitol (SPAN®'s) with palmitic acid (SPAN® 40), stearic acid (SPAN® 60) and oleic acid (SPAN® 85) where the aliphatic chain of the acid is considered sterically bulky; tartaric acid esters with cyclohexanol and Isofol 20 where the cyclohexane moiety and the branched chain of Isofol are considered sterically bulky; polymers such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid) where the polymeric chain in itself is considered sterically bulky.

The non-covalent chemical bonding between the functional moiety of the precursor/pigment and the complementary functional moiety of the stabilizer is, for example, afforded by van der Waals' forces, ionic bonding, hydrogen bonding, and/or aromatic pi-stacking bonding. In embodiments, the non-covalent bonding is ionic bonding and/or hydrogen bonding but excluding aromatic pi-stacking bonding. In embodiments, the non-covalent bonding may be predominately hydrogen bonding or may be predominately aromatic pi-stacking bonding, where the term "predominately" indicates in this case the dominant nature of association of the stabilizer with the pigment particle.

In embodiments, for the acid dissolution of the pigment, any suitable agent may be used to completely solubilize the pigment subjecting the solution to conditions, which re-precipitate the solubilized pigment into nano-sized particles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof.

Any suitable liquid medium may be used to carry out the re-precipitation of the benzothioxanthene pigment so as to afford nanoscale particles. Examples of suitable liquid media include, but are not limited to, the following organic liquids such as: N-methyl-2-pyrrolidinone, dimethyl sulfoxide, N,N-dimethylformamide, N,N-dimethylacetamide, sulfolane, hexamethylphosphoramide, among others.

Any liquid that will not dissolve the pigment may be used as an optional precipitating agent. Illustrative precipitating agents include, but are not limited to, alcohols such as methanol, ethanol, 1-propanol, 2-propanol, 1-butanol, 2-butanol; water; tetrahydrofuran; ethyl acetate; hydrocarbon liquids such as hexanes, toluene, xylenes, and Isopar liquids; and mixtures thereof.

The steric stabilizer loading in the reaction may vary between about 5 to about 300 mol %, such as about 10 to about 150 mol %, or about 20 to about 70 mol % to pigment. Optionally, the solids concentration of the nanoscale pigment particle in the final precipitated mixture may vary from 0.5% to about 20% by weight such as from about 0.5% to about 10% by weight, or about 0.5% to about 5% by weight, but the actual value may also be outside these ranges.

In an embodiment, the crude benzothioxanthene pigment is first solubilized in an acidic liquid, such as, concentrated sulfuric acid, which is then added slowly under vigorous agitation to a second solution comprising a suitable solvent and a steric stabilizer compound, and optionally a minor amount of a surface-active agent or other common additive. During the addition, the temperature is maintained anywhere from about 0° C. to about 40° C., although the re-precipitation of benzothioxanthene pigment to form nanoscale particles may be held isothermally within or outside this temperature range in one embodiment and, in another embodiment, the temperature during re-precipitation of benzothioxanthene pigment to form nanoscale particles may also be allowed to cycle up and down within or outside this temperature range.

In an embodiment, a first solution is prepared or provided that comprises pigment particles dissolved or dispersed in a strong acid. The strong acid may be, for example, a mineral acid, an organic acid, or a mixture thereof. Examples of strong mineral acids include sulfuric acid, nitric acid, perchloric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like.

This first solution may include the strong acid in any desirable amount or concentration, such as to allow for desired dissolution or dispersion of the pigment particles. The acid solution contains pigment in a concentration of about 0.5% to about 20%, such as from about 1% to about 15% or from about 2% to about 10% by weight, although the values may also be outside these ranges.

In an embodiment, the second solution is prepared or provided that comprises the steric stabilizer. Suitable steric stabilizers include those described earlier, and may include others such as the surface-active agents described previously that have functional groups that also interact with the functional moieties of the pigment particles to provide additional stabilization. The steric stabilizer may be introduced in the form of a solution, where the steric stabilizer is either dissolved or finely suspended in a suitable liquid medium, such as water or polar organic solvents such as acetone, acetonitrile, ethyl acetate, alcohols such as methanol, ethanol, isopropanol, diethyl ether, tetrahydrofuran, N-methyl-2-pyrrolidinone, dimethyl sulfoxide, N,N-dimethylformamide, mixtures thereof, and the like. For example, a suitable liquid medium in an embodiment is a mixture of water and N-methyl-2-pyrrolidinone. Such mixtures may contain water and N-methylpyrrolidinone in a ratio of about 1:6 to about 1:3, and such as about 1:4.

In an embodiment, a precipitating agent, such as those described above, may also be incorporated into the second solution. Precipitating agents are liquids that do not solubilize the pigment and include, but are not limited to, water, alcohols such as methanol, ethanol and isopropanol and various mixtures thereof. The precipitating agent may be added in a range of about 10% to about 100% by volume out of the total volume of the mixture, such as between about 20% and about 80%, or between about 30% and about 70%.

The re-precipitation of the pigment to form nanoscale pigment particles may be conducted by adding the first (dissolved pigment) solution to the second (steric stabilizer) solution. This addition is conducted slowly by adding the first (dissolved pigment) solution to the second (steric stabilizer) solution under agitation by use of mechanical stilling or homogenization or other means. Methods of addition may include drop-wise from a suitable vessel, or spraying with or without the use of a nebulizing gas.

The re-precipitation process may be conducted at any desired temperature to allow for formation of nanoscale benzothioxanthene pigment particles while maintaining solubility of the first and second solutions. For example, the re-precipitation may be conducted at a temperature of from about 0 to about 90° C., such as from about 0° to about 60° C., or from about 0° to about 30° C., although temperatures outside of these ranges may be used. In one embodiment, the re-precipitation may be performed essentially isothermally, where a substantially constant temperature is maintained, while in another embodiment, the temperature during re-precipitation may be allowed to fluctuate within the above range, where the fluctuation may be cyclic or the like.

After addition of the first solution (dissolved pigment) to the second solution, it is believed that a non-covalent bonding interaction occurs between the functional moieties present on the pigment molecules and the functional groups of the steric stabilizer molecules, which creates a steric barrier that limits or prevents further aggregation of the pigment molecules. In this way, the pigment particle size and morphology, may be controlled and even tailored by providing steric stabilizer compositions and process conditions that limit pigment particle growth to a desired level.

Once the re-precipitation is complete, the pigment nanoscale particles may be separated from the solution by any conventional means, such as, vacuum-filtration methods or centrifugal separation methods. The nanoscale particles may also be processed for subsequent use according to known methods.

In an embodiment, acid dissolution and reconstitution may be performed utilizing a solution of pigment in, for example, concentrated sulfuric acid and the solution is added slowly with vigorous stirring to a solution of a suitable solvent containing the optimum amount of steric stabilizer. During the addition, the temperature is maintained at about 20° C. to below about 60° C., although the re-precipitation of benzothioxanthene into nanoscale particles may be held isothermally within or outside this temperature range in one embodiment and, in another embodiment, the temperature during re-precipitation of benzothioxanthene into nanoscale particles may also be allowed to cycle up and down within or outside this temperature range.

The formed nanoscale benzothioxanthene pigment particles may be used, for example, as coloring agents in a variety of compositions, such as in solid (or phase change) inks, or the like.

In specific embodiments, the inclusion of a nanoscale fluorescent pigment particle in the wax-based ink may provide an opportunity for improved inter-spherulite adhesion. In such embodiments, the sterically bulky stabilizers may be chosen to have a substantially non-polar segment covalently attached to the sterically bulky stabilizers. A sterically bulky stabilizer, for example, being polar (that is, hydrophilic) at one end and water insoluble (that is, hydrophobic) at the other end, is capable of mixing well with the wax of the ink, yet has end portions repelled from the wax so as to be at an exterior surface of wax crystals and attracted to the functional moiety of the fluorescent pigment molecule. If the hydrophobic end portions are composed of hydrogen bonding groups, the sterically bulky stabilizer may form hydrogen bonds with other similar end groups. Thus, a hydrogen bond group may be included in the sterically bulky stabilizer herein.

While not wishing to be limited by theory, wax is a collection of many microcrystals or spherulites. The weak points tend to be located at the inter-spherulite junctions where the intermolecular interactions are disjointed. Improving the adhesion between spherulites at such inter-spherulite junctions, as well as the adhesion to a substrate, can improve the properties, such as the robustness and flexibility of images formed from the wax formulation.

In some embodiments, the sterically bulky stabilizer has hydrogen bonding groups present at one end, attached to a longer chain hydrocarbon at the other end that imparts wax-like properties to the molecule, having an effect that results in the molecule blending with the wax, but orienting itself so that the hydrogen bonding groups orient toward the outside of the spherulite upon crystallization (that is, co-crystallization). As a result, the sterically bulky stabilizer is available to form hydrogen bonds with other such groups in other spherulites and/or with hydrogen bonding groups in a substrate. When the wax is cooled, spherulites grow. The hydrogen bonding groups in one spherulite bond with other hydrogen bonding groups in adjoining spherulites and/or polar groups in the substrate, and create a locked network of spherulites and/or locked network of spherulites/substrate that results in increased adhesion and strength (for example, scratch resistance) of the ink image.

The hydrogen bonding group of the sterically bulky stabilizer may be either self-complementary or a combination of groups that are themselves complementary. The molecule is functionalized with, for example, strong self complementary hydrogen bonding interactions on one end that will increase the inter-spherulite interactions in the ink. On a relative scale, the hydrogen bonding groups can be several orders of magnitude greater in strength than the dipole and van der waals interactions used in current wax based inks.

The hydrogen bonding groups within an ink vehicle molecule or within a mixture of molecules comprising an ink vehicle can be either the same as each other or different from each other.

Suitable hydrogen bonding groups may have, for example, two, three or four point hydrogen bond sites. These points are the places on the molecule where the hydrogen bonding may occur.

When the ink vehicle contains the hydrogen groups, hydrogen bonds can form. Generally, the more hydrogen bonds formed between the groups, the more strongly bound are the moieties containing these groups, and the more energy is needed to break these hydrogen bonds. In addition, generally the greater the stability constant of the hydrogen-bonded complex, the greater the tendency for the groups to associate.

In embodiments, the sterically bulky stabilizer has an anchoring chain.

The hydrocarbon chain at the hydrogen bonding croup may function as an anchoring chain. The chain may comprise, for example, a linear, branched, or unsaturated hydrocarbon having from about 2 to about 60 methylene units, such as from about 10 to about 40 or from about 12 to about 40 methylene units.

The hydrocarbon chain may be linear or substantially linear, and thus compatible with the wax of the ink composition. As such, the hydrocarbon chain enables the sterically bulky stabilizer molecule to be wax-like and to have a substantial portion that is compatible with the wax component of the ink. The anchoring chain may be of the same general type of molecule as the wax, for example comprise an olefin chain where the wax is a polyethylene, comprise an isocyanate chain where the wax is a urethane, etc.

In embodiments, the sterically bulky stabilizer co-crystallizes into the wax of the ink upon cooling/formation of spherulites. As such, the functionalized side of the sterically bulky stabilizer protrudes into the inter-spherulite area (that is, the area between growing and adjoining spherulites), and yields a material with improved self-adhesive properties.

That is, during the cooling of the ink on a substrate, the spherulites grow in size. When adjacent spherulites grow into contact with each other, the available hydrogen bonding groups on each appropriately react to physically bond the spherulites. This reaction is able to occur at the temperatures the ink is at on cooling, for example at temperatures of about 30° C. to about 100° C., such as from about 70° C. to about 100° C.

In some embodiments, the fluorescent organic nanoparticles may be prepared by preparing a polymer matrix comprising one or more resins, including one or more crosslinked resins, and one or more fluorescent dyes dispersed in the polymer matrix. The one or more fluorescent dyes may be uniformly dispersed in the polymer matrix.

In a second embodiment solid or phase change ink contain a fluorescent organic nanoparticle wherein the organic nanoparticles are prepared by preparing a polymer latex or emulsion comprising one or more crosslinking resins and one or more fluorescent dyes; and crosslinking the polymer resins to form organic nanoparticles comprising the one or more fluorescent dyes dispersed in a polymer matrix, and wherein the fluorescent organic nanoparticles are of a size less than about 500 nm, such as less than about 200 nm, or less than about 100 nm.

In some embodiments, the fluorescent organic nanoparticles are robust, hard particles and are dispersible in organic liquids.

Fluorescent dyes that may be used include any fluorescent dye that is soluble or dispersible in the polymer latex or emulsion. The one or more fluorescent dyes comprises from about 0.01 to about 50 weight percent to total weight of the nanoparticle, such as from about 1 to about 40 weight percent to total weight of the nanoparticle, or from about 3 to about 20 weight percent to total weight of the nanoparticle. Examples of suitable fluorescent dyes include, for example, aryl-acetylenes, 2,5-diaryl-oxazoles, 1,2,3-oxadiazoles, aryl-substituted 2-pyrazolidines, xanthones, thioxanthones and acridones, benzazoles, benzotriazoles, benzoquinolines, fluoresceine derivatives, derivatives of phenothiazine, phenoxazine, quinine derivatives (including quinine derivatives having fused aromatic rings), coumarins, indigo derivatives, derivatives of naphthalic anhydride and naphthalimide, perilenes and the like.

Other fluorescent dyes that may be used in the nanoparticles include fluorescent compounds or dyes that are invisible to the naked eye referred to herein as "invisible fluorescent dyes." Examples of such invisible fluorescent dyes include those that are invisible under ambient light but emit bright colors under black light, for example, those emitting green, yellow, red and orange light may also be used. Examples of such compounds include Near IR emitting compounds and dyes such as coordination compounds of organic lanthanides as described, for example, in U.S. Pat. No. 5,435,937, which is hereby incorporated by reference in its entirety. Near IR fluorescent lanthanides are fluorescence compounds which cannot be seen by the naked eye. Examples of IR emitting organic dyes are described, for example, in U.S. Pat. No. 5,093,147, which is hereby incorporated by reference in its entirety.

Suitable resins include, for example, an amorphous resin or a mixture of amorphous resins having a Tg over about 180° C., such as a Tg over about 200° C. or a Tg over about 220° C., an amorphous resin or mixture of amorphous resins with a Tg lower than about 180° C., such as a Tg over about 200° C. or a Tg over about 220° C. as long, as a crosslinker is present so that the resulting Tg of the resin is higher than about 180° C., such as a Tg, over about 200° C. or a Tg over about 220° C., and a crystalline polymer or crystalline polymer mixture as long as the melting temperature of the polymer binder is greater than about 180° C., such as the melting temperature of the polymer binder is greater than about 200° C. or the melting temperature of the polymer binder is greater than about 220° C.

Examples of suitable resins include, for example, a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid), combinations thereof and the like. The resins may also be functionalized, such as carboxylated, sulfonated, or the like, and particularly such as sodio sulfonated, if desired.

Other examples of suitable binders include amorphous polyesters like for example, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), combinations thereof and the like. The resins may also be functionalized, such as carboxylated, sulfonated, or the like, such as sodio sulfonated, if desired.

Illustrative examples of crystalline polymer resins include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfo-isophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and poly(octylene-adipate).

The crystalline resins may be prepared, for example, by a polycondensation process by reacting suitable organic diol(s) and suitable organic diacid(s) in the presence of a polycondensation catalyst. Generally, a stoichiometric equimolar ratio of organic diol and organic diacid is utilized; however, in some instances, where the boiling point of the organic diol is from about 180° C. to about 230° C., an excess amount of diol may be utilized and removed during the polycondensation process. The amount of catalyst utilized varies, and may be selected in an amount, for example, of from about 0.01 to about 1 mole percent of the resin. Additionally, in place of the organic diacid, an organic diester may also be selected, where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol may be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid, mesaconic acid, and diesters or anhydrides thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid may be selected in an amount of from about 1 to about 10 mole percent of the resin.

Linear amorphous polyester resins may be prepared, for example, by the polycondensation of an organic diol, a diacid or diester, and a polycondensation catalyst. For the branched amorphous sulfonated polyester resin, the same materials may be used, with the further inclusion of a branching agent such as a multivalent polyacid or polyol. The amorphous resin is present in various suitable amounts, such as from about 60 to about 90 weight percent, or from about 50 to about 65 weight percent, of the solids.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected may vary, for example, from about 45 to about 52 mole percent of the resin.

Branching agents used in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters of the general formula RCOOR', where R and R' include from 1 to 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Examples of suitable polycondensation catalyst for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; these catalysts are selected in amounts of, for example, from about 0.01 mole percent to about 5 mole percent based on the starting diacid or diester used to generate the polyester resin.

Linear or branched unsaturated polyesters selected for the in-situ preparation of the crosslinked particles and process of the present disclosure include low molecular weight condensation polymers that may be formed by step-wise reactions between both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions.

Typical unsaturated polyester resins useful for the present disclosure are prepared by melt polycondensation or other polymerization processes using diacids and/or anhydrides and diols.

Suitable diacids and dianhydrides include, but are not limited to, saturated diacids and/or dianhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof.

Suitable diols include, but are not limited to, for example, propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof. Preferred unsaturated polyester resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof.

Monomers used in making the selected polymer are not limited, and the monomers utilized may include any one or more of, for example, ethylene, propylene, and the like. Known chain transfer agents, for example, dodecanethiol or carbon tetrabromide, may be utilized to control the molecular weight (Mw) properties of the polymer.

The resin or resins are included in the organic nanoparticle in an amount from about 50 to about 99.99 weight percent to total weight of the nanoparticle, such as from about 60 to about 99 weight percent to total weight of the nanoparticle, or from about 80 to about 97 weight percent to total weight of the nanoparticle. However, amounts outside of these ranges may be used in embodiments, depending upon the type and amounts of other materials present.

In a particular embodiment, forming the crosslinked resin emulsion is accomplished by dissolving the unsaturated polyester resin and an initiator in a suitable organic solvent under conditions that allow the solution to be formed. Suitable solvents that may be used include those in which the resin and any other optional components (such as a wax) are soluble, and that dissolves the resin component to form an emulsion, but which solvents may be subsequently evaporated-off to leave the resin in an emulsion, such as in water, at a specific particle size. For example, suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. Particular solvents that may be used include acetone, methyl ethyl ketone, cyclohexanone, methyl acetate, ethyl acetate, dimethylsulfoxide, and mixtures thereof.

In an embodiment, the resin may be dissolved in the solvent at an elevated temperature, such as about 40 to about 80° C. or about 50 to about 70° or about 60 to about 65° C. In other embodiments, the temperature is lower than the glass transition temperature of the resin. In other embodiments, the resin is dissolved in the solvent at an elevated temperature, but below the boiling point of the solvent, such as at about 2 to about 15° C. or about 5 to about 10° C. below the boiling point of the solvent.

In addition to the resin and organic solvent, an initiator is included that subsequently crosslinks the resin. Any suitable initiator may be used such as, for example, free radical or thermal initiators such as organic peroxides and azo compounds. Examples of suitable organic peroxides include diacyl peroxides such as, for example, decanoyl peroxide, lauroyl peroxide and benzoyl peroxide; ketone peroxides such as, for example, cyclohexanone peroxide and methyl ethyl ketone; alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate; alkyl peroxides such as, for example, dicumyl peroxide, 2,5-dimethyl 2,5-di(t-butyl peroxy) hexane, t-butyl cumyl peroxide, α-α-bis(t-butyl peroxy)diisopropyl benzene, di-t-butyl peroxide and 2,5-dimethyl 2,5di(t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide; and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2di(t-butyl peroxy) butane, ethyl 3,3-di(t-butyl peroxy) butyrate and ethyl 3,3-di(t-amyl peroxy) butyrate. Examples of suitable azo compounds include 2,2'-azobis(2,4-dimethylpentane nitrile, azobis-isobutyronitrile, 2,2'-azobis(isobutyronitrile), 2,2'-azobis (2,4-dimethyl valeronitrile), 2,2'-azobis(methyl butyronitrile), 1,1'-azobis(cyano cyclohexane) and other similar known compounds.

Although any suitable initiator may be used, in particular embodiments the initiator is an organic initiator that is soluble in the solvent, but not soluble in water. Further, the initiator should be "substantially non-reactive" at temperatures up to about 65 to about 70° C. such that "substantially no crosslinking" takes place until after the resin-solvent phase is well dispersed in the water phase. As used herein, "substantially non-reactive" refers, for example, to "substantially no crosslinking" occurring between the polymer or resin material and the initiator which would affect the strength properties of the polymer or resin material. As used herein, "substantially no crosslinking" refers, for example, to less than about 1 percent, such as less than about 0.5 percent, or less than about 0.1 percent, cross linking between polymer chains in the resin.

In particular embodiments, a suitable amount of crosslinking monomer is added in order to provide improved robustness and hardness of the particles. Generally, the hardness of a particle correlates with the observed viscosity of a plurality of those particles. Therefore, an increase in the viscosity of a plurality of the particles would correspond to an increase in the hardness of the individual particles plurality of the particles.

In particular embodiments, substantially all of the initiator should react during a solvent flashing step when the mixture is raised to above about the boiling point of the solvent, such as about 80° C. or more, to flash off the residual solvent. Thus, the choice of initiator may be directed by its half-life/temperature characteristic. For example, half-life/temperature characteristic plots for Vazo® 52 (2,2'-azobis(2,4-dimethylpentane nitrile, E.I. du Pont de Nemours and Company, USA) shows a half-life greater than 90 minutes at 65° C. and less than 20 minutes at 80° C., which indicates that the initiator is particularly suitable for carrying out the crosslinking in the present solvent flashing process, because substantially no crosslinking takes place during the initial mixing phase of resin and solvent at 65° C. and substantially all of the crosslinking, occurs during the solvent flashing step at temperatures up to 80° C.

The initiator may be included in any suitable amount to provide a specific degree of crosslinking. The initiator may be included in an amount of, for example, from about 0.1 to about 20 percent by weight of unsaturated resin, such as from about 0.5 or from about 1 to about 10 or about 15 percent by weight of unsaturated resin. In an embodiment, about 3 to about 6 percent by weight initiator is added.

In some embodiments, in situ crosslinking process utilizes an unsaturated resin such as, for example, an unsaturated amorphous linear or branched polyester resin. In other embodiments, the polymer matrix is prepared by thermal (radical) initiated crosslinking. Useful free-radical thermal initiators include, for example, azo, peroxide, persulfate, and redox initiators, and combinations thereof.

Suitable azo initiators include, for example, 2,2'-azobis(4-methoxy-2,4-dimethylvaleronitrile) (available under the trade designation "VAZO 33"), 2,2'-azobis(2-amidinopropane)dihydrochloride (available tinder the trade designation "VAZO 50"), 2,2-azobis(2,4-dimethylvaleronitrile) (available under the trade designation "VAZO 52"), 2,2'-azobis (isobutyronitrile) (available under the trade designation "VAZO 64"), 2,2'-azobis-2-methylbutyronitrile (available under the trade designation "VAZO 67"), and 1,1'-azobis(1-cyclohexanecarbonitrile) (available under the trade designation "VAZO 88"), all of which are available from E.I. du Pont de Nemours and Company, Wilmington, Del.; and 2,2'-azobis (methyl isobutyrate) (available under the trade designation "V-601" from Wako Pure Chemical Industries, Ltd., Osaka, Japan).

Suitable peroxide initiators include, for example, benzoyl peroxide, acetyl peroxide, lauroyl peroxide, decanoyl peroxide, diacetyl peroxydicarbonate, di(4-t-butylcyclohexyl)peroxydicarbonate (available under the trade designation "PERKADOX 16", from Akzo Chemicals, Chicago, Ill.), di(2-ethylhexyl)peroxydicarbonate, t-butylperoxypivalate (available under the trade designation "LUPERSOL 11", from Lucidol Division, Atochem North America, Buffalo, N.Y.); t-butylperoxy-2-ethylhexanoate (available under the trade designation "TRIGONOX 21-C50" from Akzo Chemicals), and dicumyl peroxide.

Suitable persulfate initiators include, for example, potassium persulfate, sodium persulfate, and ammonium persulfate.

Suitable redox (oxidation-reduction) initiators include, for example, combinations of persulfate initiators with reducing agents including, for example, sodium metabisulfite and sodium bisulfite; systems based on organic peroxides and tertiary amines (e<g., benzoyl peroxide plus dimethylaniline); and systems based on organic hydroperoxides and transition metals (e.g., cumene hydroperoxide plus cobalt naphthenate).

After the resin and initiator are dissolved in the solvent, the resin and initiator solution is mixed into an emulsion medium, for example water such as deionized water containing a stabilizer, and optionally a surfactant. Examples of suitable stabilizers include water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate, and mixtures thereof. In a particular embodiment, the stabilizer is sodium bicarbonate or ammonium hydroxide. When the stabilizer is used in the composition, it may be present at a level of from about 0.1 to about 5 percent, such as about 0.5 to about 3 percent by weight of the resin. In embodiments, when such salts are added to the composition as a stabilizer, incompatible metal salts are not present in the composition. For example, when these salts are used the composition may be completely or essentially free of zinc and other incompatible metal ions, e.g., Ca, Fe, Ba, etc., which form water-insoluble salts. The term "essentially free" refers, for example, to the incompatible metal ions as present at a level of less than about 0.01 percent, such as less than about 0.005 or less than about 0.001 percent by weight of the wax and resin. In particular embodiments, the stabilizer may be added to the mixture at ambient temperature, or it may be heated to the mixture temperature prior to addition.

Optionally, an additional stabilizer, such as a surfactant, may be added to the aqueous emulsion medium such as to afford additional stabilization to the resin particles, particularly if wax is also included in the emulsion, albeit at a reduced level as compared to conventional wax emulsions. Suitable surfactants include anionic, cationic and nonionic surfactants. In embodiments, the use of anionic and nonionic surfactants may additionally help stabilize the aggregation process in the presence of the coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN R-K available from Daiichi Kogyo Seiyaku Co. Ltd. (Japan), or TAYCAPOWER BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}, C_{15}, C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride) available from Kao Chemicals, and the like. An example of a suitable cationic surfactant is SANISOL B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

After the stabilizer or stabilizers are added, the resultant mixture may be mixed or homogenized for any specific time.

Next, the mixture is stirred and the solvent is evaporated off. Alternatively, the solvent may be flashed off. The solvent flashing may be conducted at any suitable temperature at or above about the boiling point of the solvent in water that will flash off the solvent, such as about 60 to about 100° C., for example, about 70 to about 90° C. or about 80° C., although the temperature may be adjusted based on, for example, the particular resin and solvent used.

Following the solvent evaporation (or flashing) step, the crosslinked polyester resin particles in embodiments have an average particle diameter in the range of about 20 to about 500 nm, such as from about 75 to 400 nm, or as from about 100 to about 200 nm as measured with a Nicomp Particle Analyzer.

The polyester resin latex or emulsion may be prepared by any suitable means. For example, the latex or emulsion may be prepared by takings the resin and heating it to its melting temperature and dispersing the resin in an aqueous phase containing a surfactant. The dispersion may be carried out by various dispersing equipment such as ultimizer, high speed homogenizer, or the like to provide submicron resin particles. Other ways to prepare the polyester resin latex or emulsion include solubilizing the resin in a solvent and adding it to heated water to flash evaporate the solvent. External dispersion may also be employed to assist the formation of emulsion as the solvent is being evaporated. Polyester resin emulsions prepared by other means or methods may also be utilized in the preparation of the toner composition.

Illustrative examples of such latex polymers include, but are not limited to, poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly (styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), poly(styrene-butyl acrylate-2-carboxyethyl acrylate), poly(styrene-butadiene-2-carboxyethyl acrylate), poly(styrene-isoprene-2-carboxyethyl acrylate), poly(styrene-butyl methacrylate-2-carboxyethyl acrylate), poly(butyl methacrylate-butyl acrylate-2-carboxyethyl acrylate), poly(butyl methacrylate-2-carboxyethyl acrylate), poly(styrene-butyl acrylate-acrylonitrile-2-carboxyethyl acrylate), poly(acrylonitrile-butyl acrylate-2-carboxyethyl acrylate), branched/partially crosslinked copolymers of the above, and the like.

A third embodiment, uses fluorescent radiation-curable compositions containing at least one "fluorescent organic nanoparticle" made by emulsion-polymerization. A latex emulsion comprised of polymer particles containing fluorescent material generated from the emulsion polymerization is prepared as follows. An anionic surfactant solution and de-ionized water is mixed in a stainless steel holding tank. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of ammonium persulfate initiator and de-ionized water is prepared.

Separately a monomer emulsion is prepared consisting of methyl methacrylate, diethyleneglycol dimethacrylate, and a fluorescent pigment. This monomer solution is combined an anionic surfactant and deionized water to form an emulsion. 1% of the above emulsion is then slowly fed into the reactor containing the aqueous surfactant phase at 80° C. to form the "seeds" while being purged with nitrogen. The initiator solution is then slowly charmed into the reactor and after 10 minutes the rest of the emulsion is continuously fed in a using metering pump at a rate of 0.5%/min. Once all the monomer emulsion is charged into the main reactor, the temperature is held at 80° C. for an additional 2 hours to complete the reaction. Full cooling is then applied and the reactor temperature is reduced to 35° C. The product is collected into a holding tank.

A chain transfer agent may be added to the monomer emulsion to control the Mw properties of the polymer to be formed. Suitable chain transfer agents include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

An advantage of the present disclosure is that the organic nanoparticles have suitable thermal degradation properties. Thus, the fluorescent organic nanoparticle of the present disclosure may be used for a variety of purposes, including for producing inks and the like. Examples of inks include inkjet inks and any other ink composition. Organic nanoparticles containing invisible fluorescent dyes may be used, for example, for fabrication of marking materials, for example, inkjet compositions used for security printing.

This disclosure refers to marking as a process of producing a pattern, such as text and/or images, on a substrate, such as paper or transparent plastic. A marking device performs the marking on the substrate with a marking material. Marking materials include ink, dye, or any other suitable marking material for marking on the substrate. The fluorescent organic nanoparticles of the present disclosure may also be used in any marking device, alone or in combination with other marking materials.

The solid (or phase change) inks may also contain a colorant. Any desired or effective colorant may be employed, including pigment, dye, mixtures of pigment and dye, mixtures of pigments, mixtures of dyes, and the like, provided that the colorant may be dissolved or dispersed in the ink vehicle. Examples of suitable dyes include, for example, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red HSB (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carla Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodocaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the solid (or phase change) inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 560 (BASF); LITHOL Fast Yellow 0991 K (BASF); PALIOTOL Yellow 1840 (BASE); NOVOPERM Yellow FGL (Clariant); Lumogen Yellow D0790 (BASF); Suco-Yellow L1250 (BASF); Suco-Yellow D1355 (BASF); Stico Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALTOGEN Black L0084 (BASF), Pigment Black K801 (BASF); and carbon blacks such as REGAL 330™ (Cabot), Carbon Black 5250, Carbon Black 5750 (Columbia Chemical), and the like, as well as mixtures thereof.

The colorant may be present in the solid (or phase change) ink in any desired or effective amount to obtain the desired color or hue, for example at least about 0.1 percent by weight of the ink, or at least about 0.2 percent by weight of the ink, or no more than about 35 percent by weight of the ink, or less than 20 percent by weight of the ink or no more than about 8 percent by weight of the ink.

Solid (or phase chance) inks for color printing typically comprise a solid (or phase change) ink carrier composition which is combined with a solid (or phase change) ink compatible colorant. A series of colored solid (or phase change) inks may be formed by combining ink carrier compositions with compatible subtractive primary colorants. The subtractive primary colored solid (or phase change) inks may include, for example, four component dyes, namely, cyan, magenta, yellow and black. These subtractive primary colored inks may be formed by using a single dye or a mixture of dyes. For example, magenta may be obtained by using a mixture of Solvent Red Dyes or a composite black may be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed may comprise dyes from the classes of Color Index (C.I.) Solvent Dyes, Disperse Dyes, modified Acid and Direct Dyes, and Basic Dyes. The colorants may also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in solid (or phase change) ink compositions.

The ink of embodiments may further include conventional additives to take advantage of the known functionality associated with such conventional additives. Such additives may include, for example, biocides, defoamers, slip and leveling agents, plasticizers, pigment dispersants, viscosity modifiers, antioxidants, absorbers, etc.

Optional antioxidants in the ink may protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl) phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl) phenoxy) phenoxy) propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink can also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethyl-pentyl-4-phenylenediamino)-1,3,5-triazine (commercially available from Uniroyal), (19) 2-dodecyl-N-(2,2,6,6-tetrame-thyl-4-piperidinyl) succinimide (commercially available from Aldrich Chemical Co.), (20) N-(l-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/p-tetramethyl-3,9-(2, 4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino)benzophenone (Aldrich 16,032-6), (29) 5-chloro-2-hydroxy benzophenone (Aldrich C4,470-2), (30)

4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof. When present, the optional UV absorber may be present in the ink in any desired or effective amount, such as from about 1 percent to about 10 percent by weight of the ink or from about 3 percent to about 5 percent by weight of the ink.

The ink may also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, in another embodiment of no more than about 30 percent by weight of the ink, and in yet another embodiment of no more than about 15 percent by weight of the ink, although the amount may be outside of these ranges.

Other optional additives may include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC® 2300, NEVIAC® 100, and NEVRAC® 80 (commercially available from Neville Chemical Company), WINGTACK® 86, a modified synthetic polyterpene resin (commercially available from Goodyear), and the like.

The tackifier may be present in an amount of at least about 0.1 percent by weight of the ink, in another embodiment of at least about 5 percent by weight of the ink, and in yet another embodiment of at least about 10 percent by weight of the ink, in yet another embodiment of no more than about 50 percent by weight of the ink, although the amount can be outside of these range. Adhesives, such as VERSAMID® 757, 759, or 744 (commercially available from Henkel), may be present in an amount in one embodiment of at least 10 about 0.1 percent by weight of the ink, in another embodiment of at least about 1 percent by weight of the ink, and in yet another embodiment of at least about 5 percent by weight of the ink, in another embodiment of no more than about 50 percent by weight of the ink, and in yet another embodiment of no more than about 10 percent by weight of the ink, although the amount can be outside of these ranges.

The ink may include an optional plasticizer, such as UNIPLEX® 250 (commercially 20 available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Mon25 santo), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like.

The plasticizer may be present in an amount of at least about 0.1 percent by weight of the ink, such as at least about 1 percent by weight of the ink, such as at least about 2 percent by weight of the ink, but no more than about 15 percent by weight of the ink.

Printed images may be generated with the ink described herein by incorporating the ink into an inkjet device, for example a thermal inkjet device, an acoustic inkjet device or a piezoelectric inkjet device, and concurrently causing droplets of the molten ink to be ejected in a pattern onto a substrate such as paper or transparency material, which can be recognized as an image. The ink is typically included in the at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the phase change ink may also include heating elements to heat the ink. The phase change inks are thus transformed from the solid state to a molten state for jetting. "At least one" or "one or more," as used to describe components of the inkjet device, such as the ejecting channels, orifices, etc., refers to from 1 to about 2 million, such as from about 1000 to about 1.5 million or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The ink can be jetted onto a suitable substrate to form an image. Any suitable substrate or recording sheet may be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, paper, transparency materials, fabrics, textile products, plastics, polymeric films, inorganic substrates such as metals, ceramics, and wood, and the like.

The composition may contain any combination of elements, as long as it meets physical properties encompassed by this disclosure. Components that may be used to form the composition are disclosed in U.S. Pat. No. 6,906,118 and is incorporated herein by reference in its entirety.

The ink compositions may also optionally contain other materials, which may depend upon the type of printer in which the ink is used. For example, the carrier composition is typically designed for use in either a direct printing mode or an indirect or offset printing transfer system.

The ink compositions of the present disclosure may be prepared by any desired or suitable method. In the case of liquid ink compositions, the ink ingredients may simply be mixed together with stirring to provide a homogeneous composition, although heating may also be used if desired or necessary to help form the composition.

In addition to ink compositions, the nanoscale fluorescent pigment particles can be used in a variety of other applications, where it is desired to provide a fluorescent color to the composition. For example, the nanoscale benzothioxanthene pigment particles can also be used in the same manner as conventional pigments in such uses as colorants for paints, resins, lenses, filters, printing inks, and the like according to applications thereof.

The subject matter disclosed herein will now be further illustrated by way of the following examples. All parts and percentages are by weight unless otherwise indicated.

EXAMPLES

Example 1

Preparation of Nanoscale Fluorescent Pigment Particles:

Synthesis of the Fluorescent Pigment—Benzo[k,l]thioxanthene-3,4-dicarboxylic Anhydride In a 200 mL 3-neck round bottom flask fitted with magnetic stirrer, reflux condenser and oil bath were introduced 4 g (0.016 mol) 4-nitronaphthalene tetracarboxylic anhydride, 3 mL (0.03 mol) 2-amino-benzenethiol and 40 mL N,N-dimethyl formamide. A dark brown solution resulted. 1-Amyl nitrite, 3.2 mL (0.024 mol) was added slowly, via a syringe into the flask. The temperature of the reaction mixture rose to 80° C., and an orange precipitate formed. At the end of the addition, the temperature in the flask was allowed to drop to 60° C. The reaction mixture was then stirred at this temperature for 3 hours to insure completion of the reaction. The solid was filtered through a fritted glass and washed with N,N-dimethyl formamide twice, and once with N,N-dimethyl formamide:distilled water with a weight ratio of 1:1 until the washings were clear. The orange solid was dried in a vacuum oven at 100° C. overnight. Infrared Spectrometry using a KBr pellet resulted in the following data: double anhydride C=O peak at 1758 cm$^{-1}$ and 1721 cm$^{-1}$. The average particle size from Transmission Electron Microscopy was greater than 2 μm in length and many of the particles had a particle width greater than 500 nm.

Formation of Nanoscale Fluorescent Pigment Particles with SPAN® 40.

In a 500 mL resin kettle fitted with mechanical stirring, dropping funnel and ice/water cooling bath were introduced 300 mL N-methyl-2-pyrrolidinone and 2.6 g (0.006 mol) SPAN® 40. To this solution was added dropwise over a period of 15 minutes a solution of 30 mL sulfuric acid containing 0.5 g (0.002 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol:distilled water with a weight ratio of 2:1. The resulted mixture was filtered using a fritted class. The pigment was washed on the frit twice with 20 mL isopropanol and once with 20 mL isopropanol. Infrared Spectrometry using a KBr pellet resulted in the following data: double anhydride C=O peak at 1758 cm$^{-1}$ and 1721 cm$^{-1}$. The particle size from Transmission Electron Microscopy (wet cake) was 100-500 nm in length and less than 100 nm width.

Formation of Nanoscale Fluorescent Pigment Particles with Oleic Acid.

In a 5000 mL resin kettle fitted with mechanical stirring, dropping funnel and ice/water cooling bath were introduced 300 mL N-methyl-2-pyrrolidinone and 4.9 g (0.02 mol) oleic acid. To this solution was added dropwise over a period of 15 minutes a solution of 30 mL sulfuric acid containing 0.5 g (0.02 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol:distilled water with a weight ratio of 2:1. The resulted mixture was separated using a centrifuge. The pigment particles were washed through centrifugation once with distilled water and once with acetone. Infrared Spectrometry using a KBr pellet resulted in the following data: double anhydride C=O peak at 1758 cm$^{-1}$ and 1721 cm$^{-1}$. The particle size from Transmission Electron Microscopy (wet cake) was 100-500 nm in length and less than 100 nm in width.

The fabricated nanoscale fluorescent pigment particles had a needle like shape with a 100-500 nm in length and less than 100 nm in width. They were green-yellow fluorescent tinder UV light. The melting temperature of the initial pigment is about 320° C. As a result no leaking or melting of the fluorescent nanoparticles is expected to take place when heated for extended periods of time at 120° C. in the solid ink printer.

Example 2

Fluorescent Organic Nanoparticles Obtained by Emulsion Aggregation Latex Process.

(1) Preparation of Polyester Latex.

190 grams of amorphous propoxylated bisphenol A fumarate resin (Mw=12,500, Tg onset=56.9, acid value=16.7; available commercially as SPAR resins from Reichhold Chemicals, Inc., RESAPOL HT resin from Resana S. A. along with 10 grams (g) of DFKY-C7 (Risk Reactor) fluorescent dye were weighed out in a 1 L kettle. 100 g of methyl ethyl ketone and 40 g of isopropanol were weighed out separately and mixed together in a beaker. The solvents were poured into the 1 L kettle containing the resin. The kettle, with its cover on, a casket, a condenser and 2 rubber stoppers, were placed inside a water bath set at 48° C. for 1 hour. The anchor blade impeller was set up in the kettle and was switched on to rotate at approximately 150 RPM. After 3 hours, when all of the resins dissolved, 8.69 g of 10% NH$_4$OH was added to the mixture drop-wise with a disposable pipette through a rubber stopper. The mixture was left to stir for 10 minutes. Then 8.0 g of Vazo 52 thermal initiator was added to the mixture and the mixture was stirred for an additional 10 minutes at 48° C. Next, 600 g of de-ionized water was to be added into the kettle by a pump through a rubber stopper. The first 400 g were added in 90 minutes with the pump set to a rate of 4.44 g/min. The last 200 g were added in 30 minutes with the pump set to 6.7 g/min. The apparatus was dismantled, and the mixture was poured into a class pan, which was kept in the fume hood overnight and stirred by a magnetic stir-bar so that the solvent could evaporate off. When exposed to black light, the latex emitted red light. The particle size as measured by a Nicomp Particle Analyzer was 170 nm. This latex solution was labeled "Latex A."

(2) Preparation of Hard Particles by Crosslinking by Radical Initiation.

The above latex solution, Latex A, was charred into a 1 L 3-necked round bottom flask and purged with nitrogen gas for one hour. The mixture was then stirred at 200 RPM and heated to 80° C. and maintained at that temperature for 5 hours. At this temperature, the Vazo 52 initiator produced radicals which initiated a crosslinking reaction between the double bonds of the propoxylated bisphenol A fumarate resin. The latex was then cooled down and freeze-dried to obtain dry particles. When exposed to black light(under UV light), the latex emitted red light. The size of the particles after the crosslinking reaction was 145 nm.

These particles contain the fluorescent dye dispersed into the polyester. The polyester material which constitutes the particles binder is not miscible with solid ink composition and as a result leaching of the dye outside the particles is essentially eliminated. This prevents dye degradation due to interaction with solid ink base components.

Example 3

Fluorescent Organic Nanoparticles Obtained by Emulsion-Polymerization.

A surfactant solution consisting of 3.0 g of Neogen RK (anionic emulsifier) and 250 g, de-ionized water was prepared by mixing for 10 minutes in a stainless steel holding tank. The holding tank was then purged with nitrogen for 5 minutes before transferring into the reactor. The reactor was then continuously purged with nitrogen while being stirred at 300 RPM. The reactor was then heated up to 76° C. at a controlled rate and held constant. In a separate container, 2.13 g, of ammonium persulfate initiator was dissolved in 22 g of de-ionized water. Also in a second separate container, the monomer emulsion was prepared in the following manner. 125 g of methylmethacrylate, 5 g of diethyleneglycol dimethacrylate, 6.4 g of DFKY-C7 Fluorescent Dye (Risk Reactor), 7 g Neogen RK (anionic surfactant), and 135 g of deionized water were mixed to form an emulsion. One percent of the above emulsion was then slowly fed into the reactor containing the aqueous surfactant phase at 76° C. to form the "seeds" while being purged with nitrogen. The initiator solution was then slowly charged into the reactor and after 20 minutes the rest of the emulsion was continuously fed in using metering pump at a rate of 0.6%/minute. Once all the monomer emulsion was charged into the main reactor, the temperature was held at 76° C. for an additional 2 hours to complete the reaction. Full cooling was then applied and the reactor temperature is reduced to 35° C. The product was collected into a holding tank after filtration through a 1 micron filter bag. After drying a portion of the latex the onset Tg was observed to be 105.7° C. The average particle size of the latex as measured by Disc Centrifuge was 73 nm. The particles are red fluorescent under UV light.

Example 4

Fluorescent Solid Ink Composition Preparation.

To a 600 mL beaker were added 99 g of a Xerox Phaser 8400 solid ink base (without colorant) which was then transferred to an oven at 116° C. for 3 hours. Upon melting, the beaker with ink base was transferred to a Griffin heating mantle and was mixed using overhead stirrer at 175 RPM for 30 minutes. To the stirring molten ink base were added slowly 1.0 g of nanoscale fluorescent pigment particles formed with SPAN® 40. The solution was allowed to stir for another 4 hours whereupon it was filtered through a 6 micron filter to remove some large aggregates, followed by filtration with a 1 micron filter. The ink filtrate was poured into tubs for black inks and allowed to cool and solidify.

Approximately 80% of the pigment particle material from Example 4 was easily incorporated into the solid ink composition. The approximately 20% of the pigment particle material, not fully incorporated into the solid ink composition, was comprised of very large aggregates (>100 microns) as they were readily be seen by eye and subsequently were removed by means of filtration. It is expected that fine-tuning of the fluorescent pigment synthetic process would result in the elimination of large aggregates that are more difficult to disperse.

Comparative Example

As a comparison, the fluorescent pigment (prior to it being formed with SPAN® 40 and thus precluding it to having nanoscale particle size) was dispersed in the same manner as in Example 4. Very poor incorporation of the pigment particles in the solid ink base resulted such that the subsequent filtration through a 6 urn filter available from Pall Corporation was slow.

Example 5

Printing of Fluorescent Pigment Solid Ink Composition

Several prints were obtained from a Xerox Phaser 8400 printer conditioned with the prepared fluorescent solid ink composition from Example 4. Under normal room light, the prints appeared very light yellow, detectable by it having a slight differential gloss on the paper. When exposed to a UV light source, the prints emitted a bright green-yellow light with the fluorescent images on the prints being perfectly readable. The ink from Example 4 was allowed to reside in the Xerox Phaser 8400 printer for about two months such that subsequent prints made periodically still revealed maintenance of all printhead jets with no discernable differences in print quality or fluorescence activity of the images over that time period as compared to the first prints that were made when the ink from Example 4 was first conditioned into the printer.

Example 6

Fluorescent Solid Ink Composition Preparation Containing Visible Colorant.

A solid ink composition is made in the same manner as in Example 4 except that Xerox Phaser 8400 yellow ink is used in place of the ink base.

Example 7

Printing of Fluorescent Pigment Solid Ink Composition Containing Visible Colorant The printing of the fluorescent solid ink composition from Example 6 reveals almost no discernable change in coloristic attributes of the yellow colorant used in the Phaser 8400 yellow ink under visible light conditions but exhibits a strong "greenish" fluorescence when subjected to a UV light source.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A solid ink composition comprising:
    a phase change or solid ink carrier,
    a polymeric dispersant,
    an optional colorant, and
    a fluorescent nanoparticle composition, wherein
    the carrier comprises one or more organic compounds that are solid at room temperature but becomes liquid at a printer operating temperature for ejecting the ink composition onto a print surface, and
    the fluorescent nanoparticle composition comprises:
    a fluorescent organic nanoparticle having an average particle length of less than 150 nm,
    nanoscale benzothioxanthene pigment particles including a benzothioxanthene pigment with at least one functional moiety, and at least one sterically bulky stabilizer compound, wherein the functional moiety on the benzothioxanthene pigment associates non-covalently with the functional group of the stabilizer, the nanoscale benzothioxanthene pigment particles have an average aspect ratio (length:width) of from 1:1 to 5:1.

2. The ink composition of claim 1, wherein the fluorescent nanoparticle composition imparts color to the ink composition.

3. The ink composition of claim 1, wherein the carrier is present in an amount of 50 to 99.9 weight % of the ink, and said fluorescent nanoparticle composition is present in an amount of 0.1 to 50 weight % of the ink.

4. The ink composition of claim 1, wherein the carrier is selected from the group consisting of amides, isocyanate-derived resins and waxes, paraffins, microcrystalline waxes, polyethylene waxes, ester waxes, amide waxes, fatty acids, fatty alcohols, fatty amides and other waxy materials, sulfonamide materials, resinous materials made from different natural sources, and synthetic resins, oligomers, polymers and copolymers, and mixtures thereof.

5. The ink composition of claim 1, wherein the nanoscale benzothioxanthene pigment particles have an average particle length of less than 150 nm.

6. The ink composition of claim 5, wherein the sterically bulky stabilizer compound is present in an amount of from 1 to 300 mol % to the pigment.

7. The ink composition of claim 1, further comprising at least one additive selected from the group consisting of surfactants, light stabilizers, UV absorbers, optical brighteners, thixotropic agents, dewetting agents, slip agents, foaming agents, antifoaming agents, flow agents, oils, plasticizers, binders, electrical conductive agents, fungicides, bactericides, organic and inorganic filler particles, leveling agents, opacifiers, antistatic agents, dispersants, and mixtures thereof.

8. The ink composition of claim 1, further comprising an additional colorant compound selected from the group of pigment, dye, mixtures of pigment and dye, mixtures of pigments, mixtures of dyes, and the like.

9. The composition of claim 1, wherein the fluorescent nanoparticle composition further comprises fluorescent organic nanoparticles obtained by emulsion-polymerization.

10. The composition of claim 1, wherein the fluorescent nanoparticle composition further comprises fluorescent organic nanoparticles obtained by preparing a polymer latex.

11. The ink composition of claim 1, wherein the non-covalent association between the benzothioxanthene pigment and the sterically bulky stabilizer compound is at least one of van der Waals' forces, ionic bonding, coordination bonding, hydrogen bonding, and aromatic pi-stacking bonding.

12. The ink composition of claim 1, wherein the at least one functional moiety is selected from the group consisting of carbonyl groups, sulfur containing groups, and substituted amino groups.

* * * * *